(12) United States Patent
Zamorano

(10) Patent No.: US 8,177,055 B2
(45) Date of Patent: May 15, 2012

(54) CONVEYOR WITH AT LEAST ONE CONVEYOR SUPPORT APPARATUS

(75) Inventor: Sergio Zamorano, Spokane, WA (US)

(73) Assignee: FLSMIDTH A/S (DK)

( * ) Notice: Subject to any disclaimer, the term of this patent is extended or adjusted under 35 U.S.C. 154(b) by 45 days.

(21) Appl. No.: 12/765,997

(22) Filed: Apr. 23, 2010

(65) Prior Publication Data

US 2011/0259716 A1    Oct. 27, 2011

(51) Int. Cl.
*B65G 15/08* (2006.01)
(52) U.S. Cl. ............... 198/828; 198/818; 198/860.1
(58) Field of Classification Search .......... 198/818–830, 198/860.1, 861.1
See application file for complete search history.

(56) References Cited

U.S. PATENT DOCUMENTS

| | | | | |
|---|---|---|---|---|
| 3,065,843 A | * | 11/1962 | Madison | 198/830 |
| 3,253,416 A | * | 5/1966 | Madison | 198/824 |
| 3,844,404 A | | 10/1974 | Emmenegger | |
| 4,166,528 A | * | 9/1979 | Renner | 198/825 |
| 4,261,460 A | * | 4/1981 | Peterson, II | 198/828 |
| 4,440,293 A | * | 4/1984 | Allan et al. | 198/813 |
| 4,524,864 A | | 6/1985 | Peterson, II | |
| 6,079,551 A | * | 6/2000 | Horak | 198/819 |
| 7,530,451 B2 | * | 5/2009 | Brunone | 198/828 |

FOREIGN PATENT DOCUMENTS

WO    2011133266 A1    10/2011

OTHER PUBLICATIONS

International Search Report for PCT/US11/28429 dated May 19, 2011.
International Search Report and Written Opinion dated May 19, 2011, 7 pages.

* cited by examiner

*Primary Examiner* — James R Bidwell
(74) *Attorney, Agent, or Firm* — Aaron M. Pile; Daniel DeJoseph; Jeffrey A. Sharp

(57) ABSTRACT

A conveyor includes at least one conveyor support apparatus. Each conveyor support apparatus includes one or more bases and a plurality of supports adjacent to the at least one base. The supports are comprised of concrete. The supports extend vertically from the base. One or more idlers are connected to the supports for supporting a moveable belt. The moveable belt is supported by the one or more idlers for movement such that the moveable belt is able to move material. A method of providing conveyors and concrete support apparatuses that may be used in such conveyors are also disclosed herein.

20 Claims, 9 Drawing Sheets

US 8,177,055 B2

CONVEYOR WITH AT LEAST ONE CONVEYOR SUPPORT APPARATUS

FIELD OF THE INVENTION

The present invention relates to supports for conveyors such as overland conveyors.

BACKGROUND OF THE INVENTION

Overland conveyors are typically stationary conveyors that are supported on metal tables that have legs and stringers. The tables are typically mounted on concrete foundations or concrete sleepers. Examples of metal stringers may be found in U.S. Pat. No. 4,524,864. The metal stringers are attached to metal legs. The stringers support idlers that are configured to support a continuous moveable belt used in an overland conveyor for conveying material such as ore, minerals, dirt, rock, stone, agglomerated material or other material.

Steel stringers typically require significant installation work. For example, the steel stringers have to be installed and may require the idlers supported by the stringers to be individually aligned. Such alignment may require the use of shims due to the variances that may result in the installation of the steel stringers by installers. The shims often require the conveyor belt supported by the idlers to require additional power as a result of the use of the shims.

A new device is needed to support idlers of a conveyor apparatus and improve the speed and efficiency of installing conveyors. The device preferably replaces steel stringers or permits conveyor apparatuses to not use metal stringers. Alternatively, the device may permit the requirement for metal stringers to be substantially reduced for constructing conveyor devices. Such a device also preferably reduces or eliminates the need for the use of shims for aligning idlers as currently done when using metal stringers.

SUMMARY OF THE INVENTION

A conveyor is provided that includes one or more conveyor support apparatuses, at least one upper idler and a moveable belt. Each conveyor support apparatus includes a base and supports adjacent to the base. The supports are comprised of concrete and extend vertically from the base. The one or more upper idlers are connected to the supports for supporting the moveable belt such that the moveable belt is able to move material. The material may be, for example, dirt, agglomerated material, rock, stone, ore, or minerals.

Preferably, the conveyor is an overland conveyor. The moveable belt may be configured to move in a continuous path at least partially defined by the one or more upper idlers. The one or more conveyor support apparatuses are preferably comprised of a plurality of conveyor support apparatuses.

The one or more upper idlers may be comprised of a plurality of upper idlers. Each upper idler may be positioned between two supports of a respective conveyor support apparatus.

Each support of the one or more conveyor support apparatuses may include at least one fastening mechanism. The one or more fastening mechanisms may be configured to attach to an upper portion of the support to which the one or more fastening mechanisms are attached. Preferably, the one or more fastening mechanisms are attached such that they permit adjustable attachment of idlers to permit aligning of idlers without having to use shims.

One or more fastening mechanisms may be integrally attached to an upper portion of a respective support of a conveyor support apparatus. The integral attachment of each fastening mechanism may be formed by concrete positioned around at least a portion of that fastening mechanism curing so that the concrete is affixed to that portion of the fastening mechanism.

Preferably, each support of a conveyor support apparatus is attached to the base of that conveyor support apparatus and extends vertically from that base so that the support is upright. Of course, each support may alternatively extend vertically such that the supports are not perfectly vertical. For instance, each support may extend vertically at a 30 degree angle, a 45 degree angle, a 60 degree angle, a 70 degree angle, or an 80 degree angle relative to the base.

Embodiments of the conveyor may also include one or more lower idlers and one or more fastening mechanisms attached to the base to support the one or more lower idlers. Each fastening mechanism may be comprised of one or more rods or shafts. Preferably, the rods or shafts are composed of metal such as steel or carbon steel. The rods or shafts may be threaded to receive other portions of the fastening mechanisms such as nuts or washers or openings formed in a bracket sized and configured to support or attach one or more idlers to the rods or shafts.

An overland conveyor support apparatus is also provided. The conveyor support apparatus includes a base and a plurality of supports that extend from the base in a vertical direction. Each support is sized and configured to support at least one idler. The base and the supports are comprised of concrete.

Embodiments of the overland conveyor support apparatus may include one idler attached to the supports. The idler may be sized and configured to support a moveable belt.

Preferably, the base has a first end and a second end opposite the first end. The supports may include a first support and a second support. The first support is positioned adjacent to the first end of the base and the second support is positioned adjacent to the second end of the base. The first support and the second support extend vertically from the base such that the first support is upright and the second support is upright. Some embodiments of the overland conveyor support apparatus may include a first idler attached to the first support and the second support and a second idler attached to the base.

Embodiments of the overland conveyor support apparatus may include a first fastening mechanism positioned between the first idler and the first support to attach the first idler to the first support and a second fastening mechanism positioned between the first idler and the second support to attach the first idler to the second support. A third fastening mechanism and fourth fastening mechanism may also be provided. The third and fourth fastening mechanisms may be attached to the base to attach the second idler to the base.

A method of providing a conveyor is also provided. The method includes the steps of forming a plurality of conveyor support apparatuses comprised of at least one base and supports. The supports are comprised of concrete and are configured to extend vertically from the at least one base. The at least one base is also comprised of concrete. One or more first idler assemblies are attached to the supports and one or more second idler assemblies are attached to the base. A moveable belt is positioned along the one or more first idler assemblies and one or more second idler assemblies so that the moveable belt is moveable along the one or more first idler assemblies and one or more second idler assemblies.

Embodiments of the method may include the supports being attached to the one or more first idler assemblies by fastening mechanisms. Additionally, the one or more second idler assemblies may be attached to the one or more bases via fastening mechanisms.

Some embodiments of the method may also include aligning the one or more first idler assemblies and one or more second idler assemblies. The aligning preferably does not use any shims.

It should be understood that the one or more fastening mechanisms may include rods, shafts, L-shaped rods, L-shaped polygonal shafts or other attachment mechanism. Preferably, the fastening mechanisms include rods composed of metal such as steel or carbon steel and permit adjustable positioning of an idler assembly supported by supports or the base of a conveyor support apparatus.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of conveyors and conveyor support apparatuses are shown in the accompanying drawings.

DETAILED DESCRIPTION OF PRESENT PREFERRED EMBODIMENTS

Figure 1:
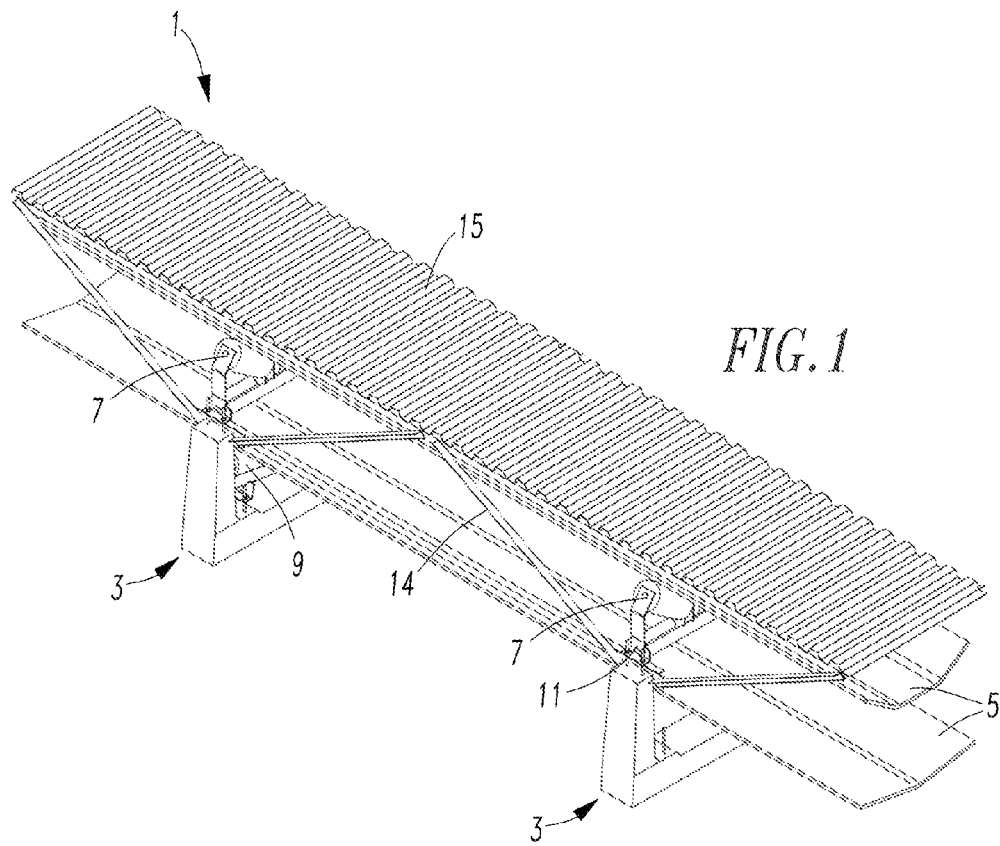
FIG. 1 is a perspective view of a first present preferred embodiment of a conveyor.

Referring to FIGS. 1-4, a conveyor 1 may include a plurality of conveyor support apparatuses 3 configured to support a moveable belt 5. The conveyor support apparatuses 3 are attached to an upper set of troughed idlers 7 and a set of lower idlers 9. The lower idlers 9 may be substantially horizontal or troughed. Fastening mechanisms 11 may attach the upper idlers 7 and lower idlers 9 to the support apparatuses 3. The conveyor 1 is preferably an overland conveyor or is a stationary conveyor. The moveable belt 5 is preferably configured to move in a continuous loop to convey or move material such as dirt, rock, agglomerated material, stone, ore, or minerals. The upper idlers 7 and lower idlers 9 may at least partially define the path of movement for the moveable belt 5.

As may be appreciated from FIGS. 5-8, each conveyor support apparatus 3 may include a base portion 19 and supports 17. The supports 17 extend vertically from ends of the base. Preferably, the supports 17 are upright. The base 19 and supports 17 are preferably composed of concrete. The concrete may be formed around fastening mechanisms 11, or at least a portion of each fastening mechanism 11. The fastening mechanisms 11 may be bars, rods, shafts, or other structure that are configured to attach the upper idlers 7 to the supports 17 and lower idlers 9 to the base 19. The supports are preferably rectangular or polygonal in shape, but may be sized and configured as other shapes. The base is also preferably polygonal shaped, but may be sized and configured as other shapes.

The base 19 and supports 17 may be comprised of concrete. In some embodiments of the support apparatuses 3, the base 19 and supports 17 may only be composed of concrete or may consist essentially of concrete. The concrete may be formed by aggregate material that is mixed with water and cement. The cement may be included to bind the material. The cement that is used may be for example, Portland cement or other types of cements or binders typically used to form concrete. It is also contemplated that the base 19 or supports 17 may also include reinforcing structures that are covered by the concrete or are integral with the concrete.

The base 19 and supports 17 are preferably sized and configured to be positioned on a concrete foundation. In some embodiments, the concrete foundation may be integral with the base 19 or a portion of the base 19. Of course, foundations composed of other materials may also be used.

Figure 2:
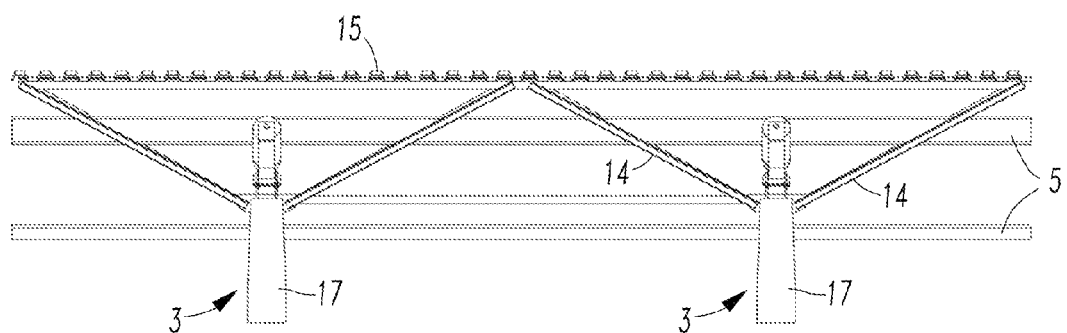
FIG. 2 is a side view of the first present preferred embodiment of a conveyor.
Figure 3:
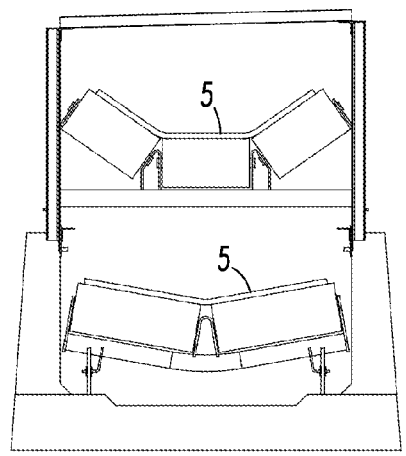
FIG. 3 is an end view of the first present preferred embodiment of a conveyor.
Figure 4:
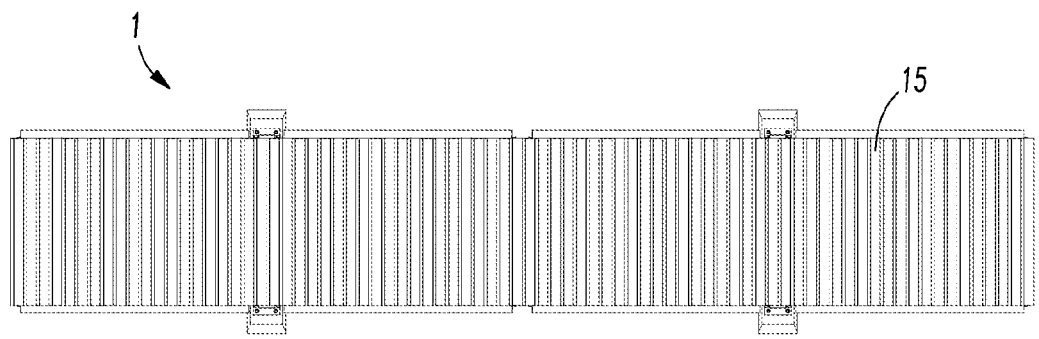
FIG. 4 is a top view of the first present preferred embodiment of a conveyor.
Figure 5:
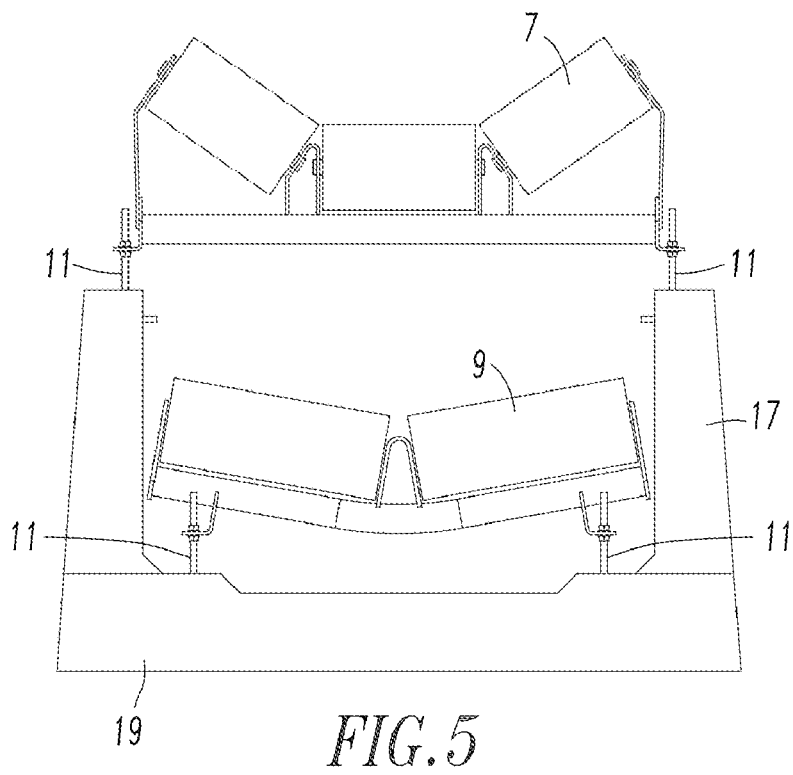
FIG. 5 is a front view of a first present preferred embodiment of a conveyor support.
Figure 6:
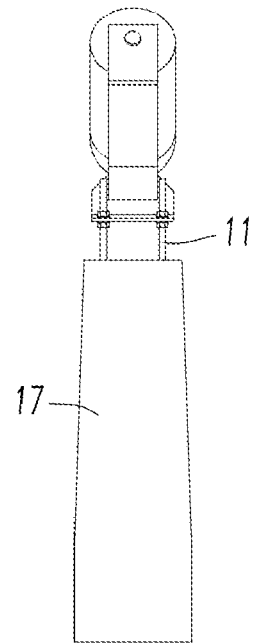
FIG. 6 is a side view of the first present preferred embodiment of a conveyor support.
Figure 7:
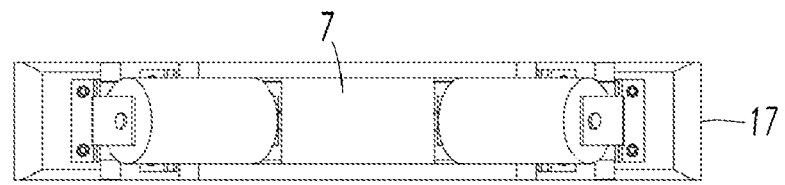
FIG. 7 is a top view of the first present preferred embodiment of a conveyor support.
Figure 8:
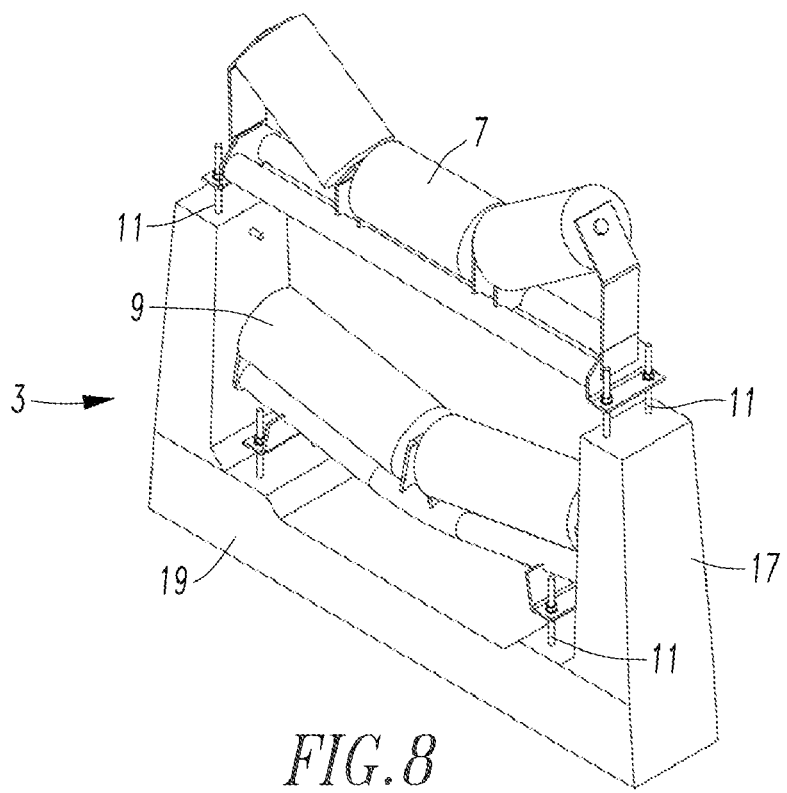
FIG. 8 is a perspective view of the first present preferred embodiment of a conveyor support.
Figure 9:
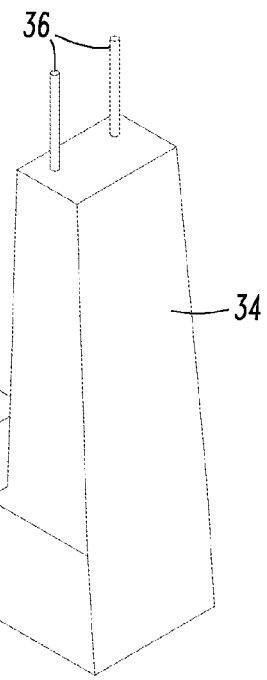
FIG. 9 is a perspective view of a second present preferred embodiment of a conveyor support.
Figure 10:
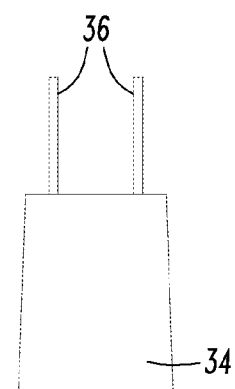
FIG. 10 is a side view of the second present preferred embodiment of a conveyor support.
Figure 11:
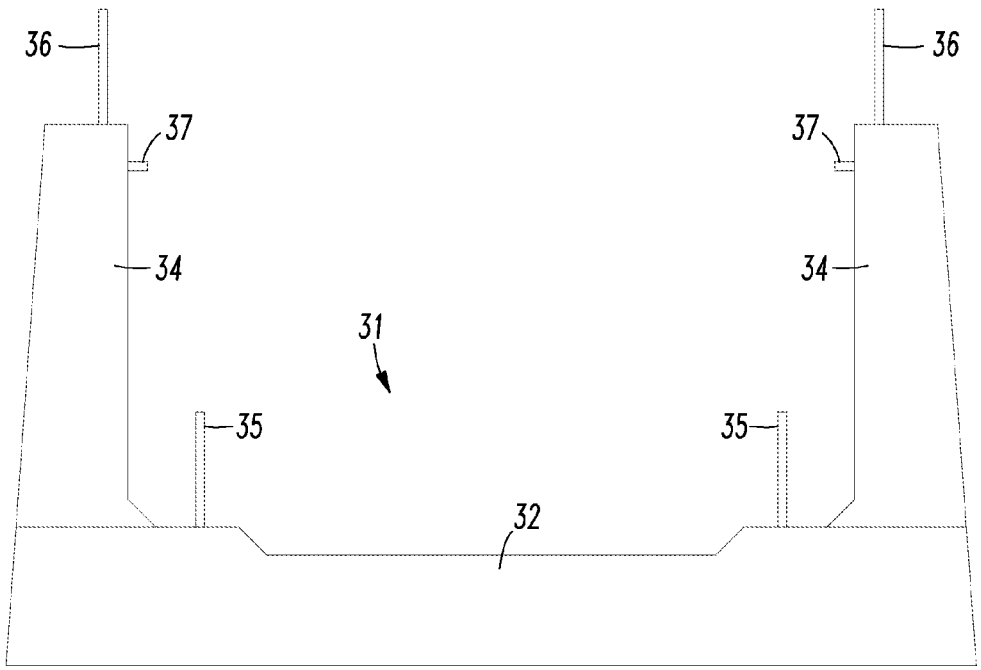
FIG. 11 is a front view of the second present preferred embodiment of a conveyor support.
Figure 12:
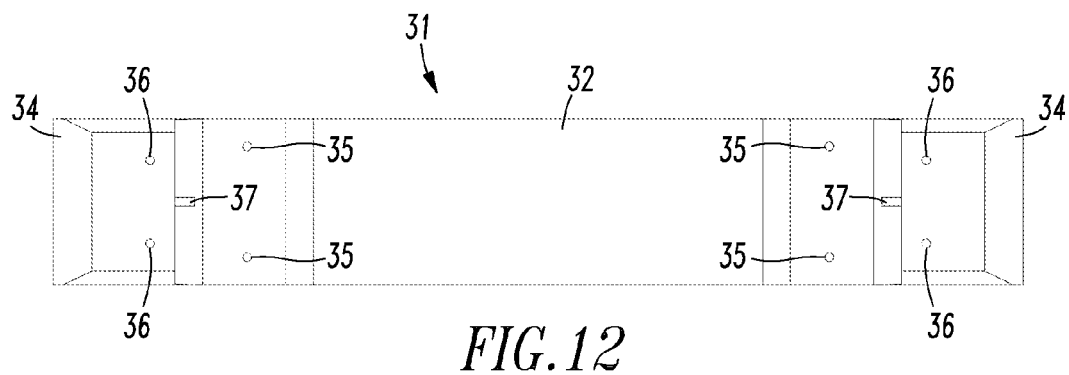
FIG. 12 is a top view of the second present preferred embodiment of a conveyor support.
Figure 13:
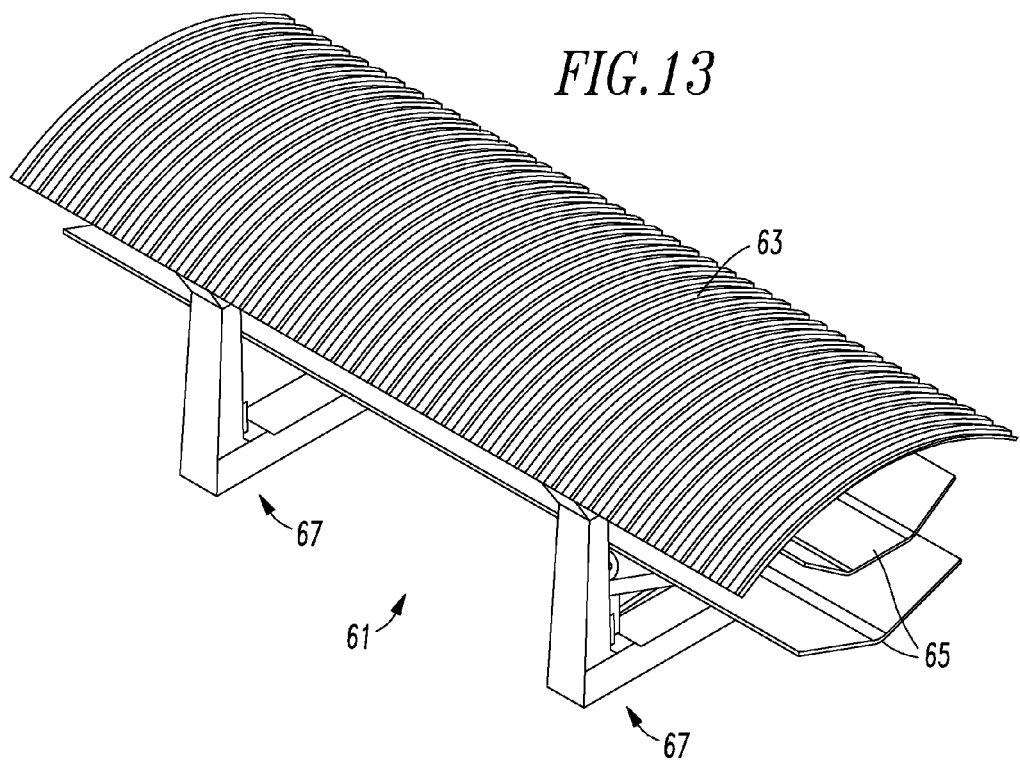
FIG. 13 is a perspective view of a second present preferred embodiment of a conveyor.
Figure 14:
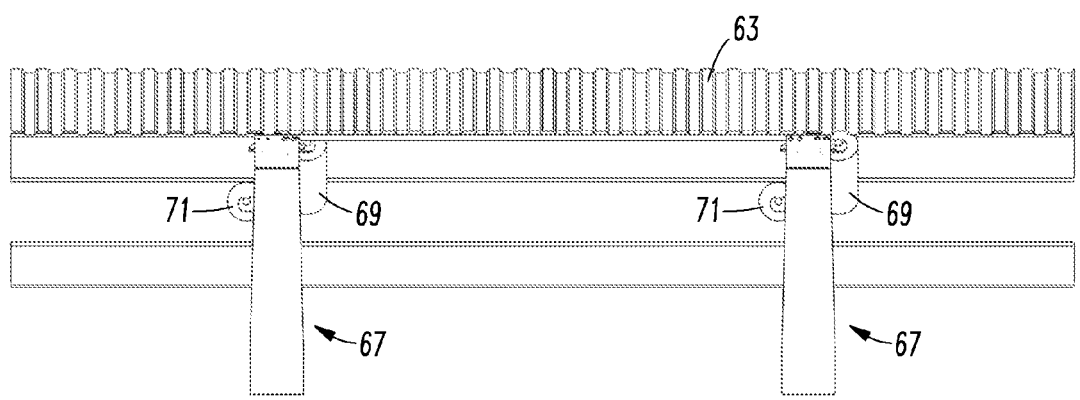
FIG. 14 is a side view of the second present preferred embodiment of a conveyor.
Figure 15:
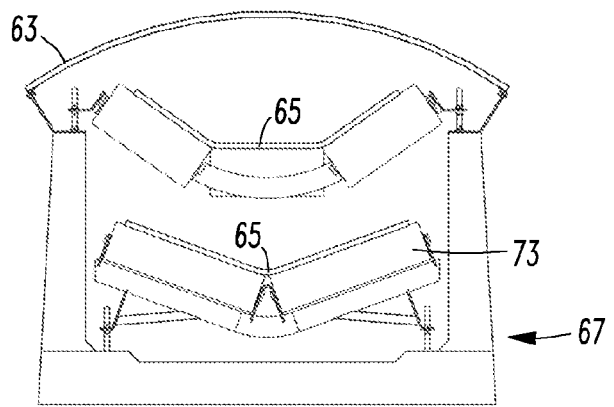
FIG. 15 is a front view of the second present preferred embodiment of a conveyor.
Figure 16:
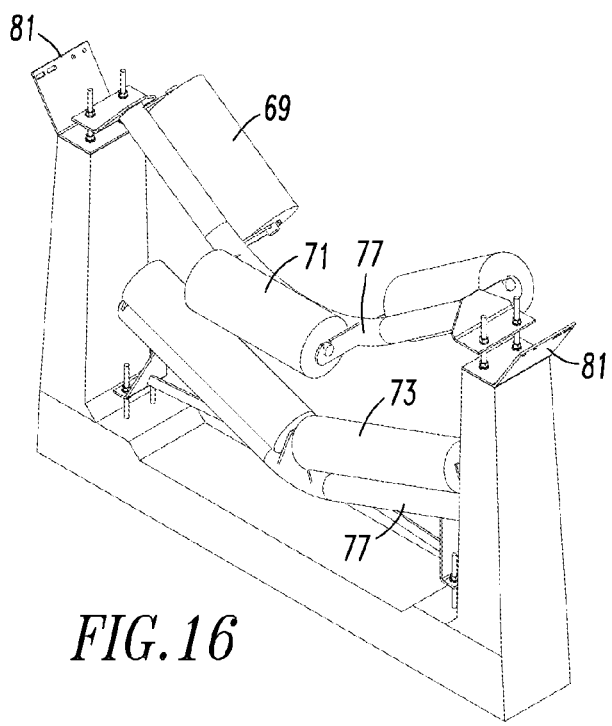
FIG. 16 is a perspective view of a third present preferred embodiment of a conveyor support.
Figure 17:
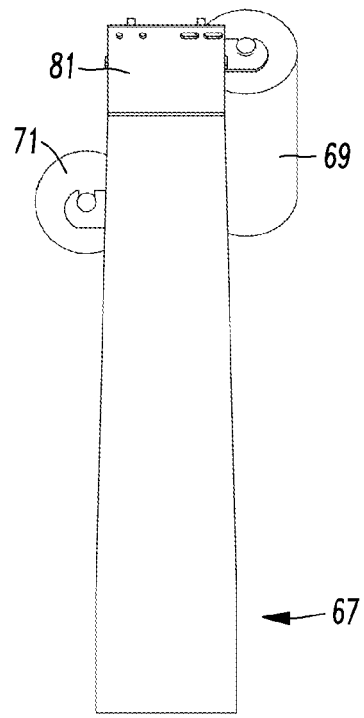
FIG. 17 is a side view of the third present preferred embodiment of a conveyor support.
Figure 18:
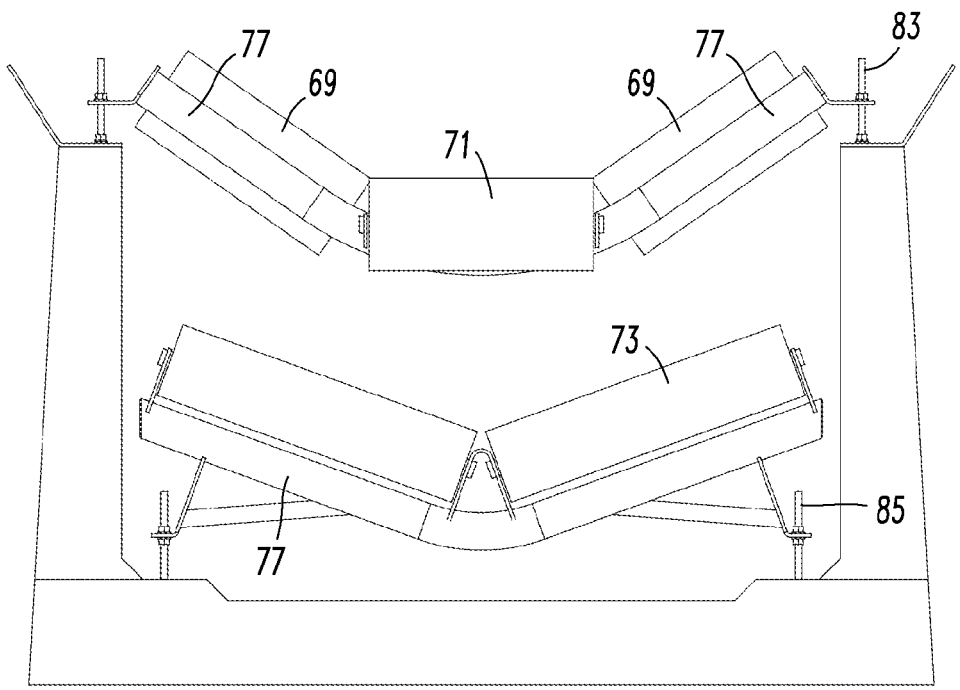
FIG. 18 is a front view of the third present preferred embodiment of a conveyor support.
Figure 19:
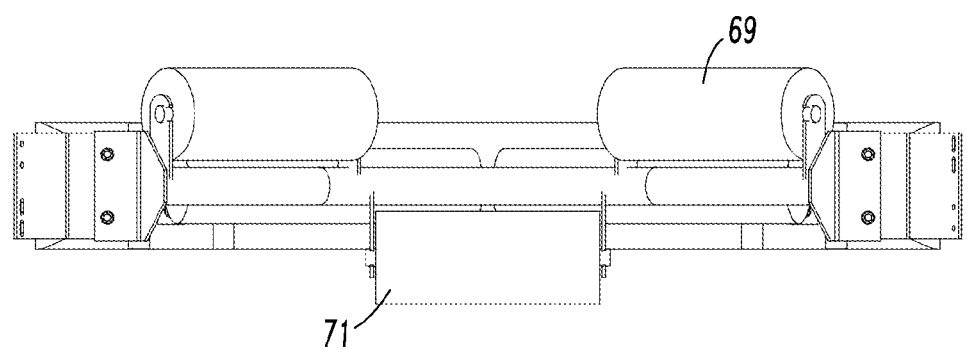
FIG. 19 is a top view of the third present preferred embodiment of a conveyor support.

Cross braces 14 may be provided between the supports 17 of the conveyor support apparatuses 3 and the conveyor belt or a table to provide support to a cover 15 positioned over the moveable belt 5 as may be seen in FIGS. 1 and 2. The cross braces 14 may help support the cover 15. The cross braces may be composed of metal and are preferably rectangular, polygonal or cylindrical in shape. The cover 15 may be a planar surface or other surface that is positioned above the moveable belt 5 to cover the upper surface of the belt and any material that may be moved via the belt 5.

Referring to FIGS. 9-12, a second present preferred conveyor support apparatus 31 is shown. That conveyor support apparatus 31 includes a base 32 that has uprights 34 adjacent to the ends of the base. The uprights 34 are composed of concrete and are integral with the base 32. The base 32 is preferably composed of concrete as well. Alternatively, the base may be composed of another material and the uprights 34 may be integral with the base via an adhesive bond formed from the concrete of the uprights curing while the bottom of each upright is on the base 32. A plurality of metal rods 35, 36 and 37 extend from the base 32 and the uprights 34. The rods are sized and configured to receive portions of idlers for attaching the idlers to the conveyor supports. Rods 36 may be sized and configured for attaching to upper idlers and rods 35 may be sized and configured for attaching to lower idlers. Rods 36 and 35 may be sized and configured to permit the idlers to be adjustably affixed to the rods 36 and 35 so that the alignment of the idlers may be adjusted without the use of one or more shims. Rods 36 and 35 are preferably composed of metal such as steel or carbon steel. The rods 36 and 35 may be threaded. The threaded rods may be configured to receive other portions of fastening mechanisms such as nuts or washers or openings formed in brackets for attaching idlers to the rods.

Rods 37 may extend from sides of the uprights. The rods 37 may be sized and configured to receive ends of respective idlers such that the idlers may rotate about the rods 37. Rods 37 may alternatively be positioned to register with holes in end rollers of an upper idler to ensure the idlers are positioned in a desired alignment. For example, the position of the rods 37 may be configured so that the rods 37 are at the same height and same orientation to ensure the upper idler is aligned properly. Rods 37 are preferably composed of metal such as steel or carbon steel.

Referring to FIGS. 13-19, a conveyor 61 may include supports 67 that support a moveable belt 65. The moveable belt 65 may be covered by a curved cover 63. The cover 63 may be rounded or formed in the shape of an elongated arch so that sides of the arched cover 63 may help support the cover 63 on posts of the concrete supports 67. The concrete supports 67 may support a plurality of idler assemblies. Upper idler assemblies may include upper idlers 69 and 71. Lower idler assemblies may include a plurality of lower idlers 73. The upper idlers 69 and 71 may be under hung idlers. It is also contemplated that the lower idlers 73 may be configured to be under hung idlers in alternative embodiments.

The upper idlers and lower idlers may be attached to idler supports 77 attached to fastening mechanisms. The fastening mechanisms may include fastening devices such as brackets attached between respective ends of the idler supports and respective rods 83 and 85. In alternative embodiments it is contemplated that the rods 83 and 85 may be shafts, bars or other elongated members. The rods 83 and 85 may be threaded so that nuts, washers, or other fastener components of the fastening mechanisms may be used to attach the idler supports to the rods 83 and 85.

Cover attachment devices 81 may be attached to the upper portions of the supports 67. Each cover attachment device 81 may include an upward angled sidewall sized and configured to engage a portion of a lower edge of the cover 63 to retain the cover 63 and attach the cover 63 to the supports 67. Opposite cover attachment devices 81 may retain opposite lower ends of the curved cover 63 to retain and hold the curved cover 63. The cover attachment devices 81 may also include fasteners, adhesives or other mechanisms to attach the curved cover 63 to the cover attachment devices 81 for attaching the cover 63 to the supports 67 so that the supports 67 may support the cover 63.

Conveyors may be provided to a customer by installing a conveyor, such as an overland conveyor on property owned, rented or leased by the customer. The conveyor may be installed by forming and positioning a number of conveyor supports along the property. The conveyor supports may be formed by pouring wet concrete into molds on the property or another location and placing them on a prepared surface on the ground or over a concrete foundation. The conveyor supports may also be formed by pouring wet concrete into molds that were pile driven in the ground. For example, the concrete may be poured into molds that provide for a base and uprights or supports positioned adjacent ends of the base. Fastening mechanisms such as rods or shafts may be positioned in portions of the base or supports for attaching idlers to the conveyor support apparatuses. It is contemplated that the molds may have preformed apertures for receiving such rods or shafts. The conveyor supports may be attached to idlers via those fastening mechanisms. The idlers may be attached to the conveyor support apparatuses so the idlers can support a moveable belt for conveying material.

A contractor or other entity may provide a conveyor such as the conveyor shown in FIGS. 1-4. For instance, a contractor may receive a bid request for a project related to designing a system for conveying material or may offer to design such a system. The contractor may then provide a conveyor. That conveyor may be an overland conveyor that utilizes conveyor support apparatus, such as embodiments of the conveyor support apparatuses described above or shown in FIGS. 5-19. The contractor may provide such devices by selling those devices or by offering to sell those devices. The contractor may provide embodiments that are sized and configured to meet the design criteria of a client or customer. The contractor may subcontract the fabrication, delivery, sale, or installation of a component of any of the devices or of other devices to provide such conveyors to provide or install those components. The contractor may also survey a site and design or designate one or more storage areas for conveying material. In addition to providing a conveyor, the contractor may also provide overland trippers, reclaimers, mobile hoppers or other conveyors or material handling devices. The contractor may also maintain, modify or upgrade the provided devices. The contractor may provide such maintenance or modifications by subcontracting such services or by directly providing those services.

While certain present preferred embodiments of the conveyor, conveyor support apparatus and methods of making and using the same have been shown and described above, it is to be distinctly understood that the invention is not limited thereto but may be otherwise variously embodied and practiced within the scope of the following claims.

What is claimed is:

1. A conveyor comprising:
    at least one conveyor support apparatus, each conveyor support apparatus comprising a base and a plurality of supports adjacent to the base, the supports comprised of concrete, the supports extending vertically from the base;
    at least one upper idler, the at least one upper idler connected to the supports; and
    a moveable belt supported by the at least one upper idler for movement such that the moveable belt is able to move material; and
    at least one lower idler and at least one fastening mechanism attached to the base to support the at least one lower idler and at least one fastening mechanism attached to each support for attaching the at least one upper idler to that support; and
    wherein the conveyor is an overland conveyor.

2. The conveyor of claim 1 wherein the at least one fastening mechanism attached to the base to support the at least one lower idler is comprised of a plurality of threaded rods sized and configured such that the at least one lower idler is adjustably attachable to the base and the at least one fastening mechanism attached to each support for attaching the at least one upper idler to that support is comprised of at least one threaded rod sized and configured such that the at least one upper idler is adjustably attachable to the support.

3. The conveyor of claim 1 wherein the moveable belt is configured to move in a continuous path at least partially defined by the at least one upper idler and wherein the at least one conveyor support apparatus is a plurality of conveyor support apparatuses.

4. The conveyor of claim 3 wherein the at least one upper idler is comprised of a plurality of upper idlers, each upper idler being positioned between two supports of a respective conveyor support apparatus.

5. The conveyor of claim 1 wherein each support is also comprised of at least one fastening mechanism attached to an upper portion of that support.

6. The conveyor of claim 5 wherein each at least one fastening mechanism is integrally attached to the upper portion.

7. The conveyor of claim 6 wherein the integral attachment of each at least one fastening mechanism is formed by concrete positioned around at least a portion of that fastening mechanism curing such that the concrete is affixed to that portion of that fastening mechanism.

8. The conveyor of claim 1 wherein each support is attached to the base and is extending vertically from the base such that the support is upright.

9. The conveyor of claim 1 wherein the at least one fastening mechanism attached to the base to support the at least one lower idler is sized and configured such that the at least one lower idler is adjustably attachable to the base; and
the at least one fastening mechanism attached to each support for attaching the at least one upper idler to that support is sized and configured such that the at least one upper idler is adjustably attachable to the support.

10. An overland conveyor support apparatus comprising:
a base comprised of concrete; and
a plurality of supports extending from the base in a vertical direction, each support sized and configured to support at least one idler; and
the supports comprised of concrete;
wherein the base has a first end and a second end opposite the first end, and the supports are comprised of a first support and a second support, the first support being positioned adjacent to the first end of the base and the second support being positioned adjacent to the second end of the base, the first support and the second support extending vertically from the base such that the first support is upright and the second support is upright; and
a first idler assembly attached to the first support and the second support and a second idler assembly attached to the base.

11. The overland conveyor support apparatus of claim 10 further comprising a first fastening mechanism positioned between the first idler assembly and the first support to attach the first idler assembly to the first support, a second fastening mechanism positioned between the second support and the first idler assembly to attach the first idler assembly to the second support, a third fastening mechanism attached between the base and the second idler assembly and a fourth fastening mechanism attached between the base and the second idler assembly, the third and fourth fastening mechanisms attaching the second idler assembly to the base.

12. The overland conveyor support apparatus of claim 11 wherein the first mechanism provides an adjustable attachment of the first idler assembly to the first support, the second fastening mechanism provides an adjustable attachment of the first idler assembly to the second support and the third and fourth fastening mechanisms provide adjustable attachment of the second idler assembly to the base.

13. The overland conveyor support apparatus of claim 12 wherein the first fastening mechanism is comprised of at least one first threaded rod extending from an upper portion of the first support, the second fastening mechanism is comprised of at least one second threaded rod extending from an upper portion of the second support, the third fastening mechanism is comprised of at least one third threaded rod extending from the base and the fourth fastening mechanism is comprised of at least one fourth threaded rod extending from the base.

14. The overland conveyor support apparatus of claim 13 wherein the first and second fastening mechanisms are utilized so that no shims are needed for aligning the first idler assembly when the first and second idler assemblies are attached to the first and second supports and wherein the at least one first threaded rod is comprised of metal and the at least one second threaded rod is comprised of metal.

15. The overland conveyor support apparatus of claim 10 wherein the base is sized and configured for being positioned over a prepared surface on ground, adjacent to a concrete foundation, or in the ground.

16. The overland conveyor support apparatus of claim 15 wherein the concrete foundation is integral with the base.

17. A method of providing a conveyor comprising:
forming a plurality of conveyor support apparatuses comprised of at least one base and supports, the supports comprised of concrete and configured to extend vertically from the at least one base, the at least one base comprised of concrete;
attaching at least one first idler assembly to the supports of the at least one conveyor support apparatus;
attaching at least one second idler assembly to the at least one base of the at least one conveyor support apparatus;
positioning a moveable belt along the at least one first idler assembly and at least one second idler assembly so that the moveable belt is moveable along the at least one first idler assembly and at least one second idler assembly.

18. The method of claim 17 wherein the at least one first idler assembly is attached to the supports via fastening mechanisms and the at least one second idler assembly is attached to the at least one base via fastening mechanisms.

19. The method of claim 18 further comprising aligning the at least one first idler assembly and aligning the at least one second idler assembly, the aligning of the at least one first idler assembly not using any shims and the aligning of the at least one second idler assembly not using any shims.

20. The method of claim 18 wherein each fastening mechanism is comprised of at least one rod, at least one threaded rod, at least one bar, at least one elongated member, or at least one shaft.

* * * * *